Patented June 11, 1935

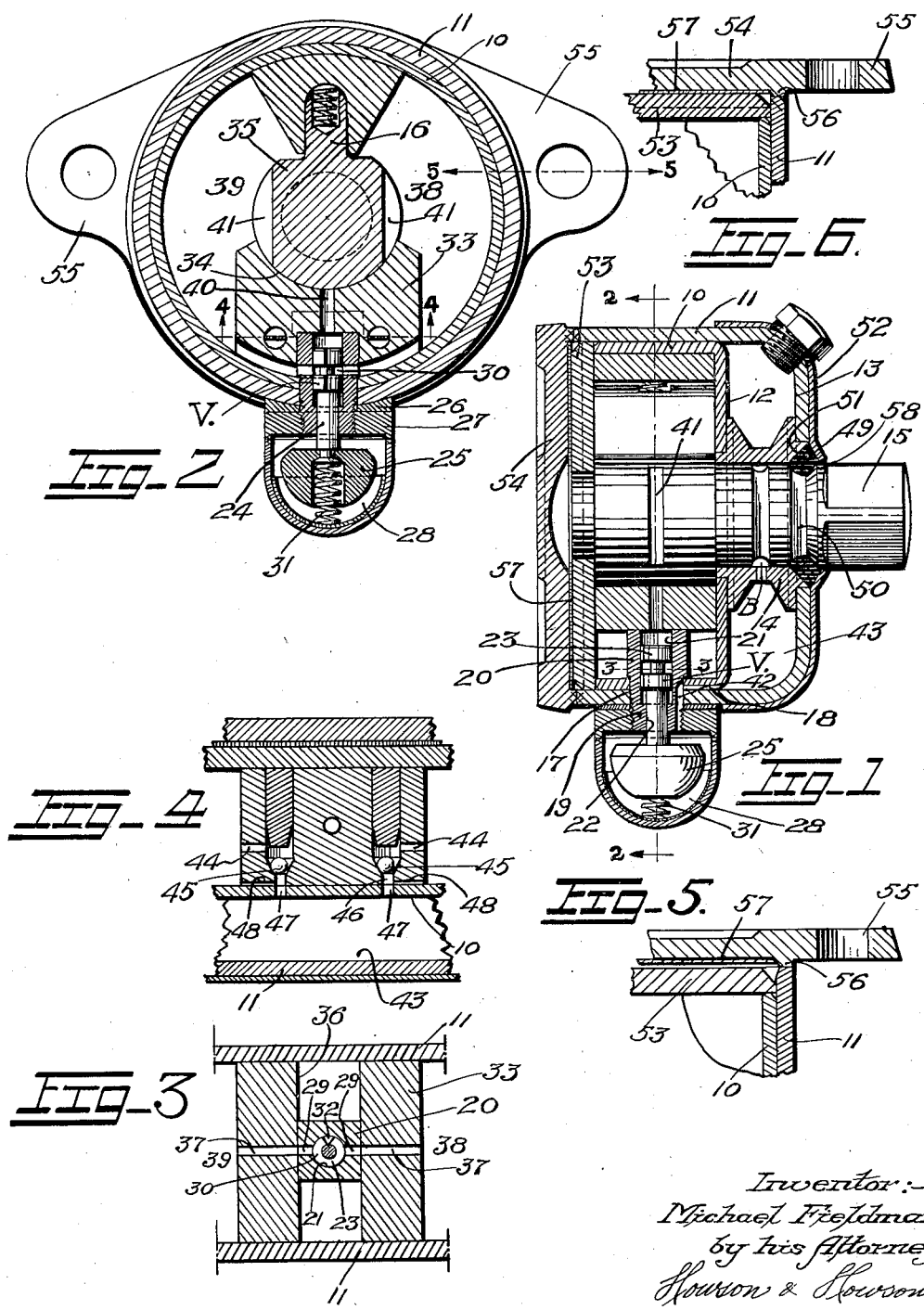

2,004,910

UNITED STATES PATENT OFFICE 2,004,910

INERTIA CONTROLLED HYDRAULIC SHOCK ABSORBER

Michael Fieldman, Philadelphia, Pa., assignor, by direct and mesne assignments, to Houde Engineering Corporation, Buffalo, N. Y., a corporation of New York Application January 27, 1933, Serial No. 653,912

35 Claims. (Cl. 188—89)

This invention relates to inertia-controlled hydraulic shock absorbers, and more particularly to an inertia-controlled shock absorber of the double-acting oscillating type.

An important object of the invention is the provision in an oscillating type shock absorber of inertia control of the fluid resistance of the absorber while at the same time providing a structure which may be very economically manufactured and which will be free from fragile parts or parts which will require adjustment so that the entire absorber may be constructed as a sealed unit insofar as its operating elements are concerned.

A further and more specific object of the invention is to combine in a single shock absorber of this type control means whereby both inertia control and excess movement control of the fluid resistance may be had.

A still further object of the invention is the provision in a shock absorber of the type just described of an arrangement such that a single valve controls the fluid resistance both in response to inertia and response to excessive relative movements of the running gear and chassis.

A further object of the invention is the provision in a structure of this character of an arrangement such that the control valve mechanism acts as an anchoring mechanism for properly locking the partition element of the shock absorber in position in the working chamber.

These and other objects I attain by the construction shown in the accompanying drawing wherein, for the purpose of illustration, I have shown a preferred embodiment of my invention and wherein:

Fig. 1 is a vertical sectional view through an oscillating shock absorber constructed in accordance with my invention;

Fig. 2 is a section on line 2—2 of Fig. 1;

Fig. 3 is an arcuate section taken on the line approximately indicated by the line 3—3 of Fig. 1;

Fig. 4 is a section on line 4—4 of Fig. 2;

Fig. 5 is a section on line 5—5 of Fig. 2 showing the cover plate in position for welding; and Fig. 6 is a similar view showing the cover plate in its final position.

Referring now more particularly to the drawing, the shock absorber comprises inner and outer cup-shaped elements 10 and 11, of which the cup-shaped member 10 forms the outer and one end wall of the working chamber, and the cup-shaped member 11 comprises the outer and one end wall of the casing. These elements are press fitted, the end walls 12 and 13 thereof being held in spaced relation by a bearing element 14 flanged for engagement with the end walls 12 and 13 about axial openings in these end walls, for the passage of the shaft 15 of a piston 16.

Each of members 10 and 11 is apertured in its side walls, as indicated at 17, and the outer face of the wall of the cup-shaped member has a groove 18 extending from the aperture 17 to its rear wall 12 for a purpose presently to appear. Apertures 17, as noted, extend through the outer walls of the cup-shaped members at the bottom thereof and are adapted for the passage of the shank 19 of the valve casing 20 of a pressure controlling valve V. The valve casing 20 and the upper end of the shank have a bore 21, while the lower end of the shank has a reduced bore 22, the main bore slidably receiving the head 23 of a vertically-reciprocable valve element having a stem 24 which projects through the lower end of the shank of the valve casing and beyond such lower end has a weight 25 secured thereto. Through an adapting washer 26 a nut 27 engages the threaded lower end of the shank 19, this nut being hollow and forming a housing 28 for weight 25. Valve casing 20 has diametrically opposed ports 29 and the head 23 of the valve is circumferentially grooved as at 30. A spring 31 extending between the lower end of the housing 28 and the weight serves to normally maintain the groove 30 in alignment with ports 29. To provide against oil or air lock in vertical reciprocation of the valve in its casing, the valve head is vertically notched throughout its length as indicated at 32.

The partition element comprises a preferably solid body 33 having an internal diameter 34 fitting the hub 35 of the piston 16 and an external diameter fitting the internal diameter of the outer wall of cup 10. In the center of its outer wall, the body 33 is transversely slotted with a key slot 36 of a size to snugly fit the valve casing 20, the partition body 33 being placed in position by sliding it between the piston hub and side walls and over the valve casing. In its outer diameter, the body further has a longitudinal groove forming ports 37 which, in the seated position of the body, align with ports 29 of the valve casing and, in the normal position of the valve, with the groove 30 thereof so that an unobstructed passage is provided between the pressure chambers 38 and 39 lying between each face of the partition element and the piston 16. Partition body 33 has a vertical bore 40 communicating at its lower end with the upper end of the bore of the valve casing and at its upper end terminating in the inner diameter 34 of the partition body. The upper end of this bore is normally closed by the piston hub 35, but in event of an excessive circumferential movement of the piston hub in either direction, a knife slot 41 formed in one side or the other of this hub places a pressure chamber 38 or 39 in communication with the bore 40. Ports 37 and 29 are constructed to apply a predetermined resistance during all movements of the piston in excess of those accompanying spring-absorbed shocks and, accordingly, in any excessive movement of the piston which must be as a result of an excessive shock, the pressure in the chamber 38 or 39, as the case may be, will be communicated through port 40 to the upper end of the valve head 23, depressing the valve so that the head interrupts flow through the ports 37 and 29 and a considerable pressure resistance to further travel of the piston is, accordingly, generated. It will be noted that the piston hub and partition element constitute a valve controlling delivery of generated pressure for operating valve V.

Since the illustrated position of the piston is that position which it occupies when the vehicle is at rest under normal load, the valve will thus be pressure-actuated for increased resistance either upon excessive approach or separation of the running gear from the chassis. The valve, furthermore, acts in response to any rapid movement of the chassis either toward or away from the axle in response to weight 25, the movement in one direction being against spring 31 and in the opposite direction against the force of gravity in response to such sudden movements.

It will be noted that the groove 30 of the valve head 23 is at the approximate center thereof so that when the valve is either raised or lowered, there will be a corresponding checking of the flow through passages 37 and 29.

To insure quietness of operation of the valve and its associated weight, and to resist inertia response by the valve to minor shocks, the housing 28 is preferably kept filled with the same fluid employed in the shock absorber. This is accomplished by forming upon one side of the shank 19 of the casing a flat providing a port 42 communicating at its lower end with the interior of this housing and at its upper end with the port produced by the groove 18 of working chamber cup 10. This groove 18 communicates at its rear end with the space between the bottom walls of the cups, which space constitutes a storage chamber 43. The partition element may be provided with the usual replenishing ports 44, each controlled by a check valve 45, as more clearly shown in Fig. 4. The ports 44 each include a branch 46 opening through the rear face of the partitioning element and aligning with an opening 47 formed in the bottom wall 12 of the working chamber cup. It will be noted that the valve means which anchors the partition serves to maintain proper alignment between the branches 46 and openings 47. As at present indicated, the rear wall of the partitioning element has fine slots 48 extending from the branches 46 to the side faces of the partitioning element which slots will serve as bleeders for permitting passage of any air trapped in the working chamber to the storage chamber 43.

Means are provided for preventing escape of fluid from the casing along the shaft 15, this means including a packing 49 and a bleed B disposed within the limits of the bearing and inwardly of this packing. The packing is at present shown as provided by grooving shaft 15 at 50 and inwardly bevelling the outer end of bearing 14 as at 51. This provides a chamber in which a compressible packing element may be readily disposed and maintained in compressed condition by means of a cap 52 press fitted over the base end of the casing cup 11.

As a means for sealing the absorber, I provide an end plate 53 adapted to fit within cup 11 and against the end of the side wall of cup 10 and a closure plate 54 adapted to fit against the end of the side wall of casing 11, this closure plate having attachment ears 55 for mounting the shock absorber. As will be noted by inspection of Figs. 5 and 6, the plate 54 has an inwardly-extending flange 56 adapted to abut the end of the side wall of cup 11, this flange and the end of the side wall being shaped in accordance with flash welding practice. In assembly, these ends are brought into engagement with an incompressible dielectric strip 57 disposed between the plates 53 and 54 within the flange 56 of closure plate 54 thus insulating the bulk of the bodies of the closure plate and end plate 53 and concentrating the welding effort at the flange 56 and edge of the side wall of cup 10. With the application of heat in the welding operation, pressure is likewise applied, driving both plates to their final position, as illustrated in Fig. 6. Cap 52 is preferably apertured for the reception of the reduced extension 58 of the hub of piston 16.

It will be obvious that by employing the arrangement herein set forth, a shock absorber may be very readily and cheaply produced which not only includes an inertia control in an oscillating type shock absorber, but likewise provides for pressure control with the use of but a single movable valve.

Due to the method employed in assembly, the apparatus can be very cheaply manufactured and is proof against faulty operation as a result of tampering.

Since the construction employed is capable of considerable modification without in any manner departing from the spirit of the invention, I do not wish to be understood as limiting myself thereto except as hereinafter claimed.

I claim:

1. In a hydraulic shock absorber, a working chamber, a piston and a partitioning element dividing said chamber into compartments, passage means connecting the compartments, inertia-controlled valve means controlling said passage means, and means to apply generated pressure to close the valve means.

2. In a hydraulic shock absorber, a working chamber, a piston and a partitioning element dividing said chamber into compartments, passage means connecting the compartments, inertia-controlled valve means controlling said passage means, and means to apply generated pressure to close the valve means, said valve means locking the partitioning means against circumferential movement in the working chamber.

3. In a hydraulic shock absorber, a working chamber, a piston and a partitioning element dividing said chamber into compartments, passage means connecting the compartments, and inertia-controlled valve means controlling said passage means, said valve means locking the partitioning means against circumferential movement in the working chamber.

4. In a hydraulic shock absorber, a working chamber, a piston and a partitioning element dividing said chamber into compartments, passage means connecting the compartments, inertia-controlled valve means controlling said passage means, and piston-controlled means to apply pressure to close the valve means.

5. In a hydraulic shock absorber, a working chamber, a piston and a partitioning element dividing said chamber into compartments, passage means connecting the compartments, inertia-controlled valve means controlling said passage means, and means controlled by the piston for positively closing the valve means.

6. In a hydraulic shock absorber, a working chamber, a piston and a partitioning element, dividing said chamber into compartments, passage means connecting the compartments, inertia-controlled valve means controlling said passage means, and piston-controlled means to apply pressure to close the valve means, said valve means locking the partitioning means against circumferential movement in the working chamber.

7. In a hydraulic shock absorber, a working chamber, a piston and a partitioning element dividing said chamber into compartments, a passage means connecting the compartments, inertia-controlled valve means controlling said passage means, and means controlled by the piston for positively closing the valve means, said valve means locking the partitioning means against circumferential movement in the working chamber.

8. In a hydraulic shock absorber, a working chamber, a piston in said chamber, passage means permitting limited flow from one side of the piston to the other thereof, inertia-controlled valve means controlling said passage, and means operable only after a predetermined piston movement in either direction to apply generated pressure to close the valve means.

9. In a hydraulic shock absorber, a working chamber, a piston in said chamber, a passage means permitting limited flow from one side to the other of the piston, a single valve controlling said passage means, inertia controlling means for said valve positioning the valve to obstruct said passage means upon rapid movement of the working chamber in either of two opposed directions, and means to apply generated pressure to close the valve.

10. In a hydraulic shock absorber, a working chamber, a piston in said chamber, a passage means permitting limited flow from one side to the other of the piston, a single valve controlling said passage means, inertia controlling means for said valve positioning the valve to obstruct said passage means upon rapid movement of the working chamber in either of two opposed directions, and means controlled by the piston to apply generated pressure to close the valve.

11. In a hydraulic shock absorber, a working chamber, a piston in said chamber, a passage means permitting limited flow from one side to the other of the piston, a single valve controlling said passage means, inertia controlling means for said valve positioning the valve to obstruct said passage means upon rapid movement of the working chamber in either of two opposed directions, and means to apply generated pressure to close the valve, the piston constituting an element of a valve controlling the last named means.

12. In a hydraulic shock absorber, a working chamber, a piston and a partitioning element dividing said chamber into compartments, a single passage connecting the compartments, double-acting inertia-controlled valve means controlling said passage, and means to apply generated pressure to close the valve means.

13. In a hydraulic shock absorber, a working chamber, a piston and a partitioning element dividing said chamber into compartments, a single passage connecting the compartments, double-acting inertia-controlled valve means controlling said passage, and means to apply generated pressure to close the valve means, said valve means locking the partitioning means against circumferential movement in the working chamber.

14. In a hydraulic shock absorber, a working chamber, a piston and a partitioning element dividing said chamber into compartments, a single passage connecting the compartments, and double-acting inertia-controlled valve means controlling said passage, said valve means locking the partitioning means against circumferential movement in the working chamber.

15. In a hydraulic shock absorber, a working chamber, a piston and a partitioning element dividing said chamber into compartments, a single passage connecting the compartments, double-acting inertia-controlled valve means controlling said passage, and piston-controlled means to apply pressure to close the valve means.

16. In a hydraulic shock absorber, a working chamber, a piston and a partitioning element dividing said chamber into compartments, a single passage connecting the compartments, double-acting inertia-controlled valve means controlling said passage, and means controlled by the piston for positively closing the valve means.

17. In a hydraulic shock absorber, a working chamber, a piston and a partitioning element dividing said chamber into compartments, a single passage connecting the compartments, double-acting inertia-controlled valve means controlling said passage, and piston-controlled means to apply pressure to close the valve means, said valve means locking the partitioning means against circumferential movement in the working chamber.

18. In a hydraulic shock absorber, a working chamber, a piston and a partitioning element dividing said chamber into compartments, a single passage connecting the compartments, double-acting inertia-controlled valve means controlling said passage, and means controlled by the piston for positively closing the valve means, said valve means locking the partitioning means against circumferential movement in the working chamber.

19. In an oscillatory hydraulic shock absorber, a working chamber, a casing within which the working chamber is fitted, an end wall of the working chamber comprising a plate interiorly fitting the casing and abutting the end of the side wall of the working chamber, a closure plate for the corresponding end of the casing, a welded union between the closure plate and the side wall of the casing, and an incompressible dielectric separator between said plates.

20. In an oscillatory hydraulic shock absorber, a working chamber, a casing within which the working chamber is fitted, an end wall of the working chamber comprising a plate interiorly fitting the casing and abutting the end of the side wall of the working chamber, a closure plate for the corresponding end of the casing, said closure plate having a flange opposing and abutting the end of the side wall of the casing, a welded union between the flange of the closure plate and said side wall, and an incompressible dielectric separator between said plates.

21. In a shock absorber, a working chamber, a storage chamber against one wall of the working chamber, the working chamber having openings in said wall communicating with the storage chamber, a piston and a partitioning element in said working chamber and dividing the working chamber into compartments and air bleed grooves in the face of partitioning element opposing said wall, said grooves placing said openings in communication with said compartments.

22. In a hydraulic shock absorber, a working chamber, a piston in said chamber, a passage means permitting limited flow from one side to the other of the piston, a single valve controlling said passage means, inertia controlling means for said valve positioning the valve to obstruct said passage means upon rapid movement of the working chamber in either of two opposed directions, a storage chamber, means to replenish the working chamber from the storage chamber and means to maintain fluid from the storage chamber about said inertia controlling means to dampen and silence the operation thereof.

23. In a hydraulic shock absorber, a working chamber, stationary and movable elements in the working chamber, a casing housing the working chamber, an end wall of the working chamber comprising a plate engaging the casing and abutting the stationary and movable members of the working chamber, a closure plate for the corresponding end of the casing, said closure plate having a flange opposing and abutting the end of the side wall of the casing, a welded union between the flange of the closure plate and said side wall, and a dielectric separator between said plates.

24. In a hydraulic shock absorber, a working chamber, a piston and a partitioning element dividing said working chamber into compartments, passage means connecting the compartments and a fluid-pressure-operated valve controlling the passage means, said piston and partitioning element constituting a valve controlling the supply of fluid pressure for the closure of the fluid-pressure-operated valve.

25. In a hydraulic shock absorber, a working chamber, a piston and a partitioning element dividing said chamber into compartments, passage means in the partition element connecting the compartments and a fluid-pressure-operated valve mounted in the partition element and controlling the passage means, said piston controlling the supply of fluid pressure for the closure of the fluid-pressure-operated valve.

26. In a hydraulic shock absorber, a working chamber, a piston and a partitioning element dividing said chamber into compartments, passage means in the partition element connecting the compartments and a fluid-pressure-operated valve mounted in the partition element and controlling the passage means, said piston and partitioning element constituting a valve controlling the supply of fluid pressure for the closure of the fluid-pressure-operated valve.

27. In a hydraulic shock absorber, a working chamber, a piston and a partitioning element dividing said chamber into compartments, passage means connecting the compartments and a fluid-pressure-operated valve controlling the passage means, said piston controlling the supply of fluid pressure for the closure of the fluid-pressure-operated valve.

28. In a hydraulic shock absorber, a working chamber, a piston and a partitioning element dividing said chamber into compartments, passage means connecting the compartments, and a fluid-pressure-operated valve controlling the passage means, a port in the partition element to supply fluid pressure from the working chamber for the operation of said valve, said piston normally sealing said port from the working chamber, said piston having a channel placing the port in communication with one of the compartments after a predetermined piston movement compressing fluid in said compartment.

29. In a hydraulic shock absorber, a working chamber, a piston and a partitioning element dividing said chamber into compartments, passage means connecting the compartments, and a fluid-pressure-operated valve controlling the passage means, a port in the partition element to supply fluid pressure from the working chamber for the closure of said valve, said piston normally sealing said port from the working chamber, said piston having a channel placing the port in communication with one of the compartments during a piston movement compressing fluid in said compartment.

30. A shock absorber comprising a chamber adapted to contain a fluid, a piston movably arranged therein, a transfer passage connected at opposite ends to the opposite ends of said chamber, a fluid-pressure-operated valve controlling said passage means, said piston comprising an element of a valve controlling the supply of fluid pressure for the closure of said fluid-pressure-operated valve.

31. In a hydraulic shock absorber, a housing for hydraulic fluid, a piston structure and partitioning element dividing said housing into working chambers, normally open passage means connecting said chambers, pressure controlled valve means controlling said passage means, and means controlled by the piston structure and effective only after a predetermined movement of said piston structure in either direction for admitting fluid under pressure to said valve means for operation thereof to close said passage means.

32. A hydraulic shock absorber comprising a housing for hydraulic fluid, a stationary partition element within said housing, a piston structure oscillatable within said housing to displace fluid toward opposite sides of said partition member, a passageway through said partition member for the flow of fluid from one side of the piston to the other, a valve movable in said passageway, means yieldingly holding said valve normally in position to open said passageway, and means under control of said piston structure for admitting fluid under pressure to said valve for movement thereof to close said passageway.

33. In a hydraulic shock absorber, a housing for hydraulic fluid, a piston structure and a partitioning element dividing said housing into working chambers, passage means connecting said chambers, pressure controlled valve means controlling said passage means, and means controlled by the piston structure for admitting fluid under pressure to said valve means for operation thereof to close said passage means.

34. In a hydraulic shock absorber, a housing for hydraulic fluid, a piston structure and a partition element dividing said housing into working chambers, said partition element having a passage therethrough for flow of fluid between said chambers, a valve chamber included in said passageway, a valve movable in said valve chamber, means normally holding said valve in position to open said passageway, and means under control of said piston structure for admitting fluid under pressure from one of said chambers to said valve chamber for movement of said valve to close said passageway.

35. A hydraulic shock absorber comprising a housing for hydraulic fluid, a piston structure and a partition element in said housing dividing said housing into working chambers, a passageway through said partition element for flow of fluid between said chambers, a valve chamber included in said passageway, a valve movable in said valve chamber and having a port normally opening said passageway, and means controlled by the piston structure for admitting fluid under pressure from one of said working chambers to said valve chamber for shifting of said valve for movement of its port out of said passageway and closure of said passageway.

MICHAEL FIELDMAN.